United States Patent
Carrillo Marquez

(10) Patent No.: US 12,470,327 B2
(45) Date of Patent: Nov. 11, 2025

(54) SYSTEMS AND METHODS FOR THE TRANSMISSION OF DATA VIA MULTIPLE TRANSMISSION LINKS

(71) Applicant: Gold Data USA, Inc., Sunrise, FL (US)

(72) Inventor: Pedro Jose Carrillo Marquez, Weston, FL (US)

(73) Assignee: Gold Data USA, Inc., Sunrise, FL (US)

( * ) Notice: Subject to any disclaimer, the term of this patent is extended or adjusted under 35 U.S.C. 154(b) by 487 days.

(21) Appl. No.: 18/174,824

(22) Filed: Feb. 27, 2023

(65) Prior Publication Data

US 2023/0283408 A1 Sep. 7, 2023

Related U.S. Application Data

(60) Provisional application No. 63/315,194, filed on Mar. 1, 2022.

(51) Int. Cl.
*H04L 1/1809* (2023.01)
*H04L 1/1607* (2023.01)
*H04L 45/00* (2022.01)

(52) U.S. Cl.
CPC .......... *H04L 1/1809* (2013.01); *H04L 1/1628* (2013.01); *H04L 45/22* (2013.01)

(58) Field of Classification Search
CPC ...... H04L 1/1809; H04L 1/1628; H04L 45/22
See application file for complete search history.

(56) References Cited

U.S. PATENT DOCUMENTS

| | | | |
|---|---|---|---|
| 2005/0129028 A1* | 6/2005 | Peeters | H04L 47/245 370/444 |
| 2008/0259924 A1 | 10/2008 | Gooch et al. | |
| 2013/0083726 A1 | 4/2013 | Jain et al. | |
| 2013/0114598 A1* | 5/2013 | Schrum | H04L 45/22 370/392 |
| 2013/0136003 A1* | 5/2013 | Wang | H04L 41/0803 370/235 |

OTHER PUBLICATIONS

Z. Li, L. Tian, J. Xia and Y. Hu, "A Multipath Routing Mechanism by Packet Replication and Elimination for Reliable Communications," 2023 IEEE 23rd International Conference on Communication Technology (ICCT), Wuxi, China, 2023, pp. 1364-1369, doi: 10.1109/ICCT59356.2023.10419830. (Year: 2023).*

Zhao et al.; Coridinated Multipoint Transmission With Limited Backhaul Data Transfer; IEEE Transactions on Wireless Communications; vol. 12, No. 6, Jun. 2013; pp. 2762-2775.

US Searching Authority; International Search Report and Written Opinion for PCT/US2023/063326; Jul. 24, 2023; entire document.

* cited by examiner

*Primary Examiner* — Joseph A Bednash
(74) *Attorney, Agent, or Firm* — ALLEN, DYER, DOPPELT + GILCHRIST, P.A.

(57) ABSTRACT

A system and method and computer program structured to implement a multi-redundancy mechanism for the transmission of information over an Ethernet data network. The system comprises a device configured for the transmission of Ethernet data to a management device that may mark, tag or otherwise assign an identifier to a data packet. The management device may also replicate the packet and may transmit the original packet and the replicated packet(s) to a receiving management device. The receiving management device may unmark successfully transmitted packets and may ascertain whether a successfully delivered packet is a redundant packet such that it may be deleted.

19 Claims, 7 Drawing Sheets

SYSTEMS AND METHODS FOR THE TRANSMISSION OF DATA VIA MULTIPLE TRANSMISSION LINKS

FIELD OF INVENTION

The present invention relates to the field of data transmission systems and methods.

BACKGROUND

Redundant routes to establish communication links are believed to have been implemented to allow for multiple routes of data transmission from one point to another. Such data transmission solutions have traditionally involved various drawbacks. For example, with some solutions when there is a failure in the primary route, there is also an associated change in the data flow that is likely to create interruptions in the data transmission, even when alternative routes may be available. The occurrence of an interruption in the data transmission is generally referred to as a "flap". Such "flaps" are a major drawback of current solutions and are responsible for significant disruptions in the data transmission of various network environments.

Accordingly, there is a need in the industry to provide a solution aimed at offering stability in point-to-point Ethernet network links. The industry would benefit by providing a solution that would allow for at least a 1+1 redundancy between to network points. An even further benefit would be realized by providing a solution that would simultaneously and continuously transmit the same data traffic on various transmission routes avoiding the "flaps" that usually occur in networks where there are associated failures in any given data transmission routes. It is contemplated that such a solution would involve sending data through at least two different routes and would also involve implementing a combination of data management devices that would replicate the data and would also simultaneously send the replicated data along the various available transmission routes. As such, if any given routes fails, a receiving device may successfully receive the sent data, with an at least partially decreased rate of interruption, given that the data will be sent constantly and simultaneously through redundant routes. This may in turn, at least partially and/or fully reduce the associated commutation between different transmission zones or points, and consequently at least partially and/or fully reduce losses in data transmission.

SUMMARY

A. Overview of System

The present invention is directed to a system that enables the transmission of data and/or information via an Ethernet data network through multiple transmission routes. The inventive system generally comprises two base devices, or simply "devices", each one being operatively linked to a corresponding management device, for example via an Ethernet connection(s). In turn, the management devices are operatively linked to one another via a plurality of Ethernet transmission links. After an initial data transmission from either or both devices to a corresponding management device, the management devices may operatively transmit data and/or information between them via one or more of the plurality of transmission links. Furthermore, it is contemplated that the respective devices and management devices be located in different areas, zones, geographical locations, positions, etc. Also, it is contemplated that the system be able to transmit and/or process data as explained herein from one device the other and vice versa. However, this is not necessarily limiting as the system may be configured to establish data flow in only one direction, i.e., only from one device to the other.

The present invention contemplates providing a system that may mark or otherwise tag and/or replicate a data packet that will be transmitted. As used herein, a "packet" may refer to an element, structure, group, or component of data or information that is intended to be transmitted through the operative components of the inventive system. Either or both of the management devices may replicate a data packet before transmitting the original packet and the replicated packet(s) to an opposite or otherwise receiving management device through various transmission links. It is further contemplated that the management devices should also be capable of "marking" or otherwise "tagging" each packet with a unique identifier. A packet may be marked or tagged prior to its replication such that the replication will create copies of the packet with its original marking or identifier. As such, the replicated packets may automatically comprise an identifier the moment that they are replicated. Alternatively, a packet may be replicated first, and the original packet and the replicated packet(s) may be marked with a common identifier after the replication.

Once the packet is marked and replicated, each one of the original packet as well as the replicated packet(s) may be transmitted through a corresponding transmission link. Once an opposite or otherwise receiving management device successfully receives either an original packet or a replicated packet(s), the receiving management device is generally structured to eliminate duplicate packets, including by way of a memory alignment buffer. A memory alignment buffer, or simply an alignment buffer, may be provided to store an identifier that corresponds to the first packet that is successfully delivered to a receiving management device. The receiving management device should be configured to ascertain the specific identifier or tag associated with each successfully transmitted packet, original or replicated, upon its successful delivery. Thus, the identifier associated with the first packet that is successfully transmitted will be stored in the buffer memory. As each successive packet successfully arrives, the receiving management device will also check whether its associated identifier is already stored in the buffer memory. If a specific identifier is not stored in the buffer memory, then the receiving device is configured to accept the packet and transmit it to the corresponding device. If, however, a packet is successfully delivered and this packet comprises an identifier or tag that is already stored in the buffer memory, then the receiving management device should be configured to eliminate or otherwise discard that incoming packet. In addition, the receiving device should generally be configured to erase an identifier from the buffer memory once the last of either an original packet and/or a replicated packet(s) successfully transmitted to the receiving device.

B. Overview of Method

The present invention is also directed to a method of using a dual-reliability Ethernet communication system to enable a multi-redundancy mechanism for the transmission of information over an Ethernet data network. The method may comprise using a device(s) to transmit an initial data flow and using a management device(s) to receive the initial data flow from the device(s). The method may further comprise preparing a packet for transmission. This step may involve marking the packet with an identifier and thereafter replicating the packet. Alternatively, the method may comprise replicating the packet and marking the original packet as well as the replicated packet(s) with the same identifier. Thereafter, the method may comprise transmitting the original packet and the replicated packet(s) through various transmission links. The method may further comprise using an opposite or receiving management device to receive the original packet and/or the replicated packet(s) once they are successfully transmitted. The method may further comprise delivering a packet from the receiving management device to its corresponding base device. The method may further comprise unmarking the first successfully delivered from a group of packets and/or deleting redundant packets that may have been successfully delivered subsequent to the successful delivery of an initial packet.

The present invention is also directed to a method for implementing a network communication protocol that comprises providing a system according to the present invention. That is, a system may be provided comprising: a first device and a first management operatively configured with one another to enable a reciprocal data flow between them as well as a second device and a second management device operatively configured with one another to enable a reciprocal data flow between them. It is contemplated that each one of the first management device and the second management device may be operatively configured with one another and configured to enable a reciprocal data flow between them via a two independent transmission links.

Further, each of the first management device and the second management device may comprise an alignment buffer that is configured to store information associated with the data flow. Such information may comprise at least a sequence number associated with the original data packet and a next expected sequence number. Generally, the buffer assembly is cooperatively configured with a processor and the first management device to selectively adjust the time at which either or both of the original data packet and the duplicated data packet are sent, i.e., from the first management device to the second management device. Such delay may also be based on the time at which the first of these two packets arrive at the second management device. The inventive system may be also provided with a processor that is operatively configured with the first device, the second device, the first management device and the second management device. The processor may be further configured to enable and control the reciprocal data flow between corresponding devices and management devices as well as between management devices.

The inventive method further comprises: using the processor to receive an original data packet on the first device and to send the original data packet to the first management device; using the processor and the first management device to mark the packet with a unique identifier the comprises the sequence number and an ethertype number associated with the original data packet. The method further comprises: using the processor and the first management device to add 1 to the sequence number associated with the original data packet and to set the original ethertype number associated with the original data packet to a predetermined ethertype number; using the processor and the first management device to duplicate the original data packet and to send the original data packet and the duplicated data packet from the first management device to the second management device through independent and corresponding ones of the two transmission links; using the processor and the second management device to ascertain if the sequence number associated with the original data packet is equal to a next expected sequence number.

If the sequence number associated with the original data packet is not equal to the next expected sequence number, the method comprises using the processor and the second management device to drop the original data packet. Conversely, if the sequence number associated with the original data packet is equal to the next expected sequence number, the method comprises using the processor and the second management device to accept the original data packet and to add 1 to the next expected sequence number. The method further comprises: using the processor and the second management device to set the predetermined ethertype number to the original ethertype number; and using the processor and the second management device to unmark the original data packet and to send the original data packet to the second device.

DETAILED DESCRIPTION

A. Overview of System

Figure 1:
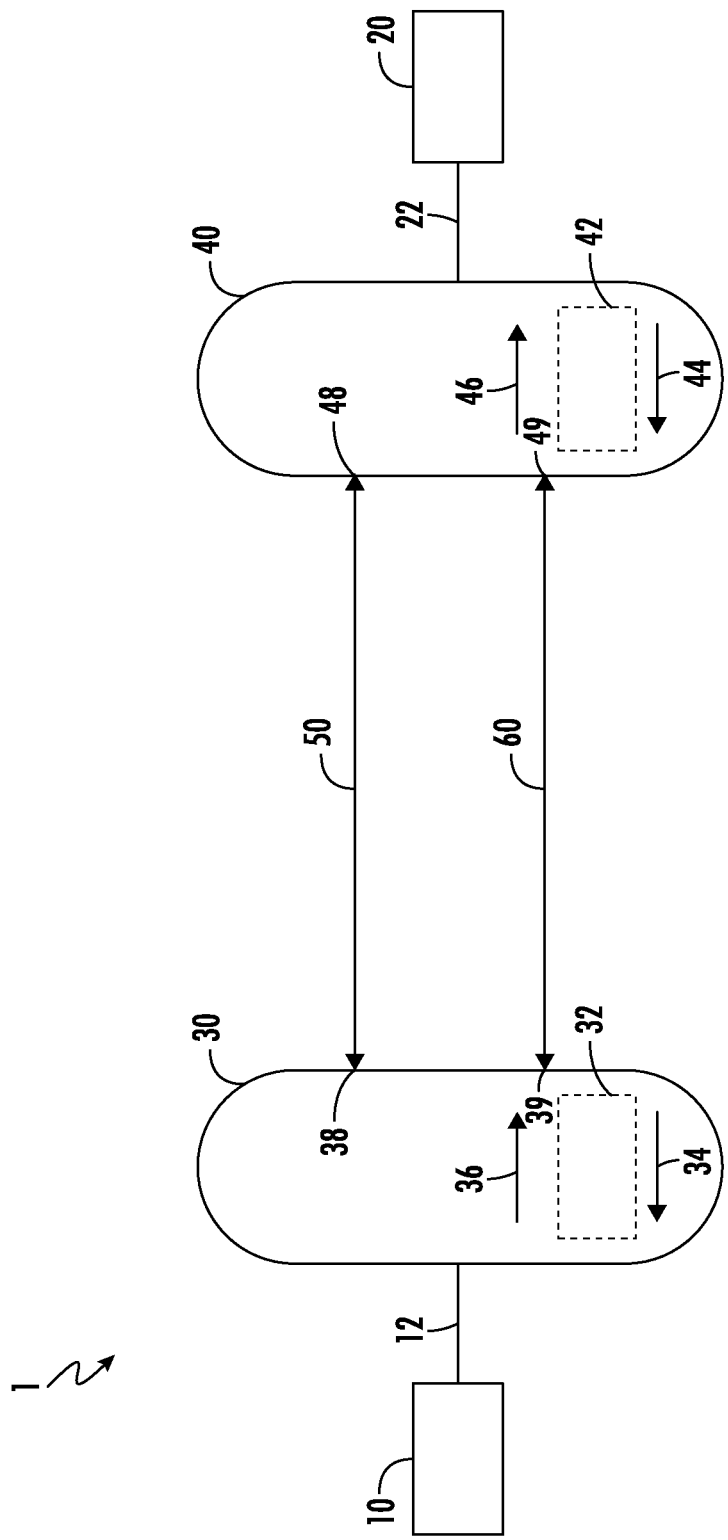
FIG. 1 is a schematic representation of one embodiment of the system according to the present invention.

With reference to FIG. 1, the present invention is directed to a system 1 that enables a communication mechanism for data networks, for example, mission-critical Ethernet networks, or other types of Ethernet networks where it is crucial to avoid or otherwise limit interruptions in the flow of data. Accordingly, the present invention is geared towards providing a solution that may implement at least two alternative routes to transmit data or otherwise information from one point to another. The system 1 according to the present invention may at least partially reduce the risk of the occurrence of a "flap" as its various components are configured to independently transmit dataflow to at least two distinct routes or otherwise transmission links, which are indicated at 50 and/or 60 in FIG. 1.

With reference again to FIG. 1, the system 1 according to the present invention may comprise a first device 10 and/or a second device 20. The devices 10 and/or 20, which may also be referred to as receivers, may be configured to send and/or receive Ethernet data and/or information via an Ethernet interface or other comparable tool. By way of example, the devices 10 and/or 20, may comprise, without limitation, a host with an Ethernet interface, e.g., a computer, server, etc., a router with an Ethernet interface, and Ethernet switch, or combinations thereof. Although the devices 10 and 20 may comprise a substantially equivalent structure and/or configuration, this is not strictly necessary as it is contemplated that the system 1 comprise devices 10 and/or 20 that comprise a different structure and/or operative configuration with respect to one another. Nonetheless, it is contemplated that an operable communication be established between the devices 10 and 20, and this may be achieved through a plurality of Ethernet connections 12 and/or 22, which connect the devices 10 and/or 20 to corresponding management devices 30 and/or 40, which will be explained below. Additionally, an operative communication between management devices 30 and/or 40 may be enabled through a plurality of transmission links 50 and/or 60.

With reference again to FIG. 1, and as briefly mentioned above, the system 1 according to the present invention comprises a plurality of transmission links, i.e., 50 and/or 60, that are configured to enable an operable communication between the management devices 30 and/or 40. After an initial data transmission from the first device 10 and/or second device 20 to a corresponding first management device 30 and/or second management device 40, the system 1 according to the present invention is configured to enable a data transmission between the management devices 30 and 40 themselves via the plurality of links 50 and/or 60. As may be appreciated in the illustrative embodiment of FIG. 1, the first device 10 may be operatively connected to the first management device 30, which itself may be disposed in an operative communication with the second management device 40. The first management device 30 may be operatively connected to the first transmission link 50 and/or a second transmission link through Ethernet connections 38 and/or 39. Similarly, as is also shown in FIG. 1, a second management device 40 may be operatively connected to the first transmission link 50 and/or second transmission link 60 via Ethernet connections 48 and/or 49. Individual transmission links 50 and/or 60 need not comprise the same latency. As such, the links 50 and/or 60 may involve different physical routes and/or transmission distances. However, it is contemplated that the transmission links 50 and/or 60 support a substantially equivalent bandwidth. Examples of the transmission links 50 and/or 60 comprise various wired Ethernet connections, including, but not limited to, UTP, e.g., 10BaseT, 100BaseT, 1000BaseT, 10GBaseT, etc., Fiber, e.g., 1000BaseLR, 10GBaseLR, 100GbaseLR4, etc.). Also, the links 50 and/or 60 comprise an Ethernet EPL service carrier, e.g., MEF2.0 standard).

Additional features of the present invention comprise providing a packet that may be marked and replicated. As used herein, a "packet" may refer to an element, structure, group, or component of data or information that is intended to be transmitted through the operative components of the inventive system 1. It is contemplated that the first management device 30 and/or second management device 40 may replicate a packet before transmitting it and that each replicated packet also be transmitted through different ones of the plurality of transmission links 50 and/or 60. It is further contemplated that the management devices 30 and/or 40 should be capable of "marking" each packet with a unique identifier, e.g., a number, code, VLAN, VLAN add-on, etc. For example, Ethernet packets may normally comprise an associated VLAN, and a further 4-byte VLAN, referred herein as a "counter tag", may be added to an already associated packet VLAN to "mark" a specific packet. This may be done to at least partially enable a transparent operation. For example, a counter tag may be associated with a given packet using an additional 802.1q header in the original Ethernet frame associated with the packet. As will be explained below, for any unmarked or otherwise untagged packets, an associated frame will be sent to the management device 30 and/or 40 where a tag, e.g., an 802.1q tag, may be added. This additional tag may be removed before delivering the frame to the receiving management device 40 and/or 30. As such, a substantially transparent operation with minimal overhead may be enabled given that the added data associated with each tagging is contemplated to be only 4 bytes larger that the native or otherwise original frame associated with any given packet.

Furthermore, the management devices 30 and/or 40 should be capable of assigning the original packet as well as the replicated packets a number that may begin at 0 and may finish in a predetermined highest number, e.g., 16'777'215. The numbering may begin again at 0 for successive packets that exceed the predetermined highest number in the sequence. It is within the scope of the present invention that a packet may be marked prior to its replication such that the replication will create copies of the packet with its original marking. However, this is not strictly necessary as a packet may be replicated first, and the original packet and the replicated packets may be marked after the replication. As such, an incoming packet from a corresponding device 10 and/or 20 may be replicated and transmitted in the directions shown at 36 and/or 46.

Once the packet is marked and replicated, each one of the original packet(s) as well as the replicated packet(s) may be transmitted through a corresponding transmission link, i.e., 50 and/or 60. Once a receiving management device, i.e., 40 and/or 30, successfully receives either an original packet or a replicated packet(s), the system 1 is generally structured to eliminate duplicate packets, including with the implementation of an alignment buffer 32 and/or 42, e.g., a 2 MB buffer or other comparable buffer with a predetermined memory. While it is contemplated that the devices 10 and/or 20, as well as the management devices 30 and/or 40 will generally allow for a data flow in reciprocal directions, i.e., from first device 10 to second device 20, and vice versa, this is not strictly necessary. For example, it is also possible to implement the inventive features of the present direction in only one direction of data flow, i.e., the direction of data flow may solely be from the first device 10 to the second device 20, or only from the second device 20 to the first device 10.

As is also seen in FIG. 1, further features of the system 1 according to the present invention comprise providing management devices 30 and/or 40 with a memory alignment buffer or otherwise alignment buffer(s) 32 and/or 42. The receiving management device 40 and/or 30 should be configured to ascertain or otherwise identify the unique identifier or tag associated with each packet and/or replicated packet upon a successful delivery to the receiving management device 40 and/or 30. Each successfully ascertained packet identifier or tag will be stored in the alignment buffer(s) 32 and/or 42. Thus, the identifier associated with the first packet that is successfully transmitted will be stored in the buffer memory. As each packet successfully arrives, the receiving management device 40 and/or 30 will also check whether its associated identifier is already stored in the buffer memory. If a specific identifier is not stored in the buffer memory, then the receiving device 40 and/or 30 is configured to accept the packet and transmit it to the corresponding device 20 and/or 10. If, however, a packet arrives comprising an identifier or tag that is already stored in the buffer memory, the receiving management device 30 and/or 40 should be configured to eliminate or otherwise discard that incoming packet, which is shown at 34 and 44 in FIG. 1.

In addition, in a dual redundancy system 1, i.e., exactly comprising two (2) transmission links, once a packet comprising an already stored identifier arrives, the system 1 should be configured to erase the identifier form the buffer memory. If more than two (2) transmission links are provided, the system 1 should be configured to only erase an identifier from the buffer memory upon a successful delivery of the last of all of the group of replicated and/or original packets. In such situations, it is still contemplated that any redundant packets will be deleted upon arrival. In addition, after the first packet, i.e., either the original packet or a replicated packet, arrives at the receiving management device 40 and/or 30, this first packet may be automatically untagged. That is, the marking or tag, i.e., the added 4-byte portion, may be removed from the packet and the packet may be thereafter transmitted to the intended final device 20 and/or 10. As such, the foregoing operative arrangement allows for a redundancy in the transmission of packets that seeks to ensure reliability in delivery and at the same time avoid a delivery of duplicated packets.

Alternatively, and as a user-selectable option, in lieu and/or in addition to the foregoing, the system 1 according to the present invention may also replicate a packet prior to sending the original packet and the replicated packet(s) through transmission links, i.e., 50 and/or 60, without marking them or otherwise adding a tag. As such, the packets may be delivered to receiving management device 40 and/or 30, i.e., two identical streams, and the system 1 will forward only the first received packet to the base device 20 and/or 10. Thereafter, a "hash" will be calculated for every packet received from both transmission links and the hash added to a hash table. The first arriving packet will be delivered to the base device 20 and/or 10, and the calculated hash will be added to the hash table. Thereafter, the system 1 may be configured such that successive packets will arrive and will also have a corresponding hash calculated. The hash(es) belonging to such successively delivered packet(s) will be compared against the values of the hash table, and if the there is an identical match on the has table, the system 1 will be configured to interpret this as a duplicated packet and will discard it. Instead, if a hash belonging to a successfully delivered packet is not found in the hash table, then the system 1 will be configured to interpret this packet as a unique packet, such that it will not be discarded, but instead it will be forwarded to the base device 20 and/or 10 and such that the calculated hash belonging to this device will be saved or otherwise stored hash table. It is within the scope of the present invention that the hash table will be updated periodically updated, and that outdated registry data will be deleted.

It is within the scope of the present invention that the various operative features described herein may be executed or otherwise implemented with various computer programs, codes, and/or interpretable and/or executable languages. These would include, without limitation, C, C++, C #, Ruby, Java, Dart, Rust, Swift, PHP, Perl, HTML, and XHTML. Furthermore, memory capabilities, e.g., computer readable memory, may be provided, including in connection with the alignment buffer, and may be operatively configured with a processor 80 operatively configured with, or otherwise disposed on, the devices 10 and/or 20, and/or the management devices 30 and/or 40, to execute a set of executable instructions to enable the various operative features described herein. Such instructions and/or user provided information may be stored, either temporarily or permanently, inside of the memory. The memory capabilities may comprise a storage unit(s), for example a hard disk, or other storage hardware or device, as well as a network adapter.

B. Overview of Method

Figure 2:
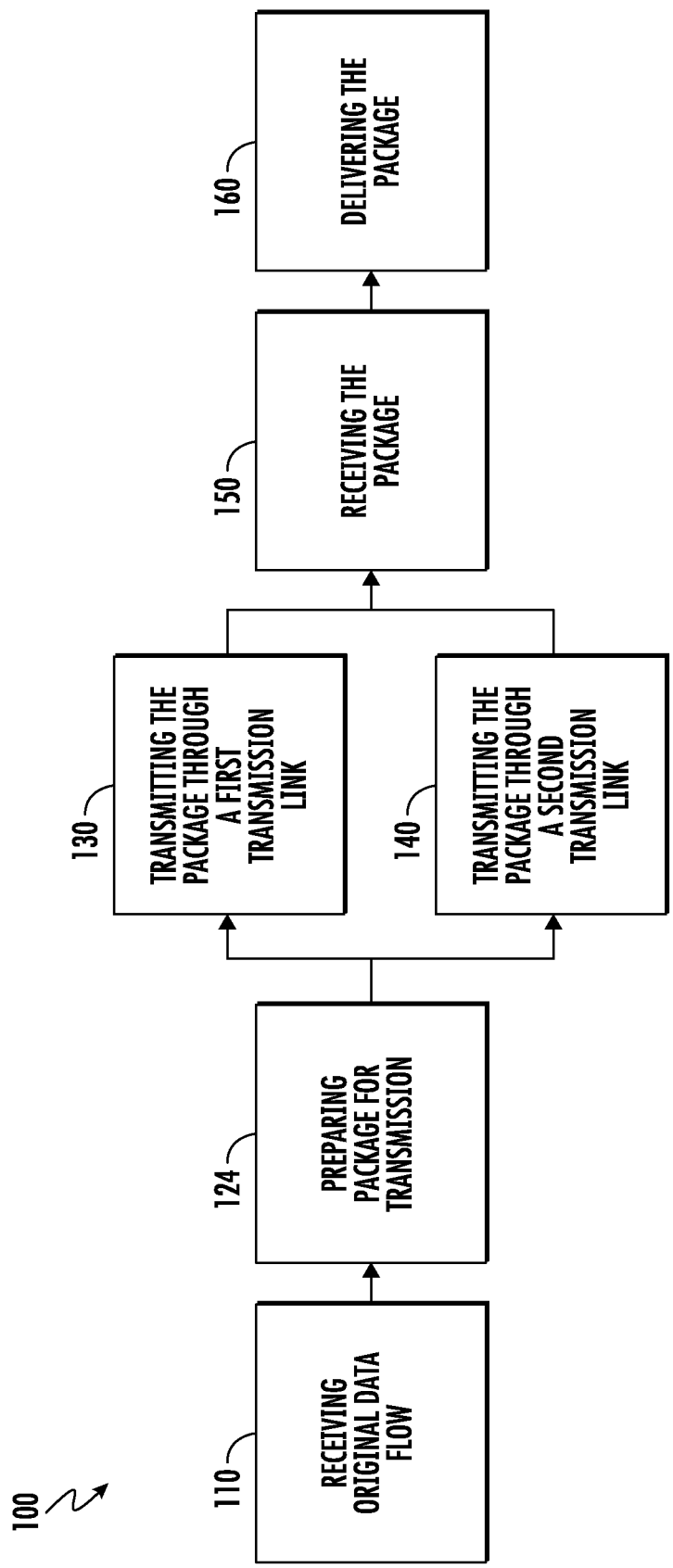
FIG. 2 is a diagrammatic representation of one embodiment of the method according to the present invention.
Figure 3:
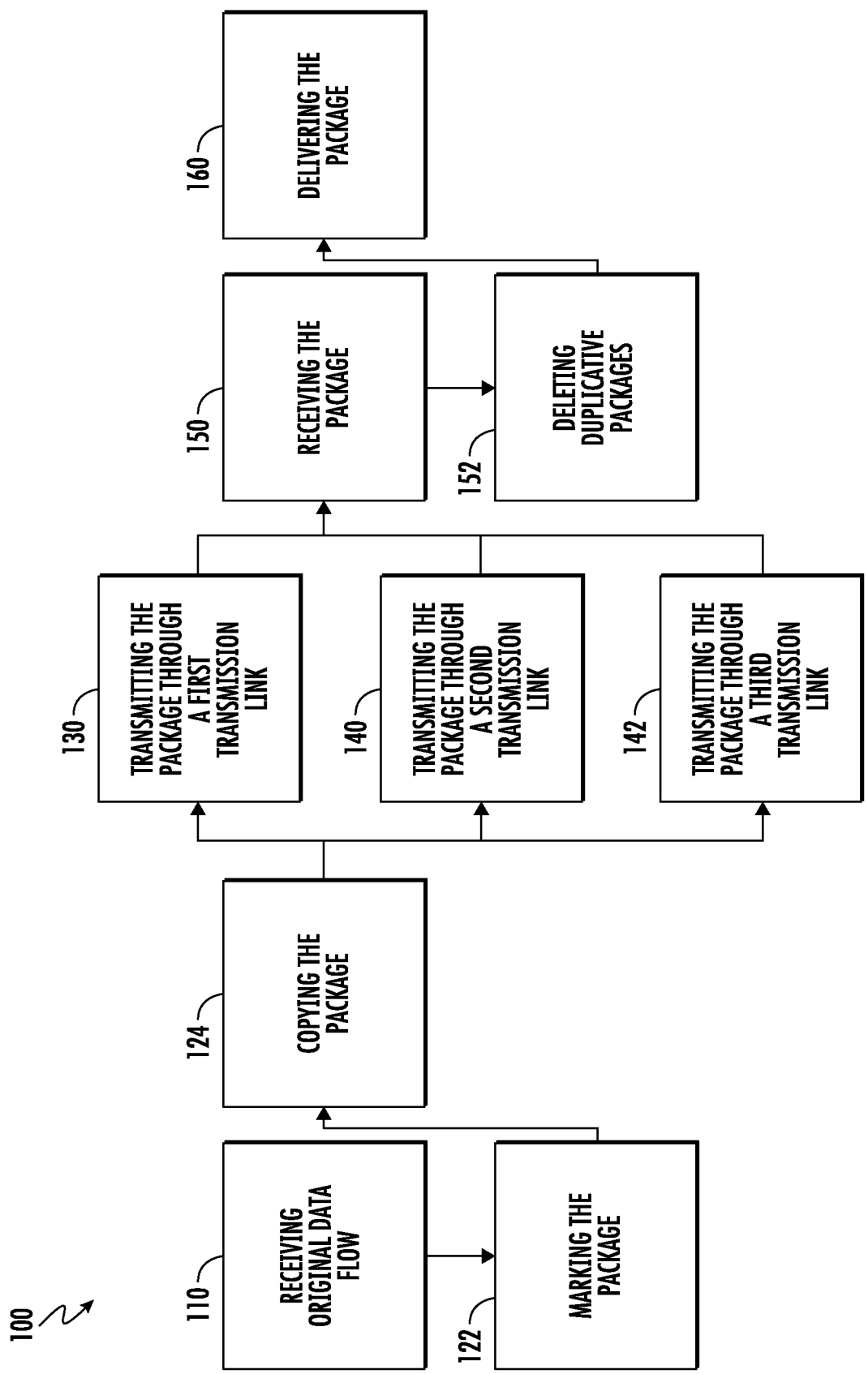
FIG. 3 is a diagrammatic representation of one embodiment of the method according to the present invention.

With reference now to FIGS. 2-3, the present invention is also directed to a method 100 of using a dual reliability Ethernet communication system 1 as described herein to transmit Ethernet data. Furthermore, the present invention is also directed to a computer program configured to implement the various operative features of the system 1 and method 100 according to the present invention. As shown at 110 in FIGS. 2-3, the method 100 according to the present invention may comprise receiving an initial data flow. For example, the method 100 may comprise using a first management device 30 to receive an initial data flow from a first device 10 as described herein. As shown at 120, the method may comprise preparing a packet for transmission. As shown at 122 in FIG. 3, this may comprise marking the packet and/or as shown at 124 copying or otherwise replicating the packet. Thereafter, the method 100 may comprise transmitting the packet through a first transmission link 130, a second transmission link 140, a third transmission linker 142, and/or other successive transmission links.

Thereafter, as shown at 150 the method 100 may comprise receiving the packet(s). For example, the method 100 may comprise using a receiving management device 40 and/or 30 to receive a packet delivered via any one of the transmission links, i.e., 50 and/or 60. Here, as shown at 152 in FIG. 3, the method 100 may comprise using the receiving management device 40 and/or 30 to delete duplicative packets. As shown at 160, the method may further comprise using the receiving management device 40 and/or 30 to deliver a packet to a corresponding device 20 and/or 10. For example, the method 100 may comprise using the receiving management device 40 and/or 30 to deliver to the final device 20 and/or 10 the first of a group of replicated packets that is successfully received by the receiving management device 40 and/or 30. Furthermore, the method 100 may further comprise unmarking the first successfully delivered from a group of packets. The method 100 may further comprise using the receiving management device 30 and/or 40 to store an identifier associated with the first successfully delivered packet, from a group consisting of the original packet and the replicated packet(s), to the memory alignment buffer 32 and/or 42 as described herein, and/or delete from the memory the stored identifier once the last of a group of replicated packet(s) is successfully delivered to the receiving management device 30 and/or 40.

With reference now to FIGS. 4-7, the present invention is directed to further embodiments of the inventive method, which are represented at 200. As with the embodiments described in the preceding sections, the method 200 also aims to provide a redundancy scheme, or a dual or otherwise 1+1 reliability scheme where packets are duplicated and sent over multiple transmission links, e.g., 50 and/or 60. The receiver management device, i.e., 40 and/or 30, is configured to receive the packet comprising a unique identifier and is configured to only forward to the corresponding device 20 and/or 10 the first version or each packet or otherwise the first packet that is received at the management device 40 and/or 30, which could be an original packet or a duplicated packet. Again, in the event of a failure in any of the transmission links 50 and/or 60, the inventive protocol ensures that there is at least 1 successful packet delivery. That is, incoming packets on a configurable ingress port, i.e., 38 and/or 39, are replicated to multiple egress ports, i.e., 38 and/or 49. As such, packets may be marked with unique identifiers that comprise a 16, 32 and/or 64 bit sequence number and a 16 bit protocol field that matches the original Ethernet ethertype, which for simplicity is herein referred to as original ethertype number. Accordingly, every time that a packet is sent, the associated sequence number of the next packet, or otherwise the next expected sequence number is increased by one (1). For example, an original data packet, which may be the first packet in a sequence, may be associated with a sequence number of 1, and every successive packet may be associated with the next available number in the sequence, e.g., the second packet may be associated with 2, the third packet with 3, etc. All of the numbers in the sequence may be stored in a memory of the inventive system 1, including, without limitation, a memory alignment buffer of the management devices 30 and/or 40. The numerical sequence associated with all of the packets is generally used at the receiving management device 40 and/or 30 for the purposes of packet de-duplication.

As ma also be appreciated in FIGS. 4-7, the inventive method 200 contemplates marking unmarked arriving packets. For example, the unique identifier may comprise not only a sequence number associated with the specific packet, but also an ethertype number. Similarly, the ethertype number of a packet may be set or otherwise set to a predetermined ethertype number, e.g., 51023, which can also be incorporated to the unique identifier. Accordingly, once duplicated, the duplicated packet will also comprise the predetermined ethertype number, which may be used to ascertain whether that particular packet or its counterpart, i.e., the duplicated or original packet, has already arrived at the receiving port. Similarly, the next expected sequence number is stored in a register field, e.g., in the memory database, memory buffer or memory assembly, and the correct index is determined by a mapping of the ingress port through a match-action table. While the described mechanism embodied in the inventive method 200 leverages Ethernet as underlying layer-2 technology, it may be used for any other transmission technology, e.g., Optical Network Transport (OTN). As contemplated by the inventive method, the unique identifier or otherwise header of any given packet may generally comprise a next sequence number (seq) as well as a next protocol field (proto). The sequence number is used to identify duplicate packets, whereas the next protocol field is used to identify the next protocol header or unique identifier within the packet.

As shown in the illustrative embodiments of FIGS. 4-7, the inventive method 200 comprises using the various components of the system 1, e.g., the processor 80, the devices 10 and/or 20, the management devices 30 and/or 40, etc., to ensure a proper marking, duplication and transmission of any given packet via at least two transmission links 50 and/or 60. As shown at 202, the method 200 comprises using the first device 10 and/or 20 and the processor 80 to receive an incoming packet, which is referred herein as an original data packet or an original packet. Thereafter, the method 200 comprises using the processor 80 and the first management device 30 and/or 40 to ascertain whether the original data packet is marked with a unique identifier. If the original data packet is not marked with a unique identifier, the method 200 may comprise using the processor 80 and the first management device 30 and/or 40 to make a determination whether the packet should be marked, i.e., for future duplication and/or transmission. If it is determined that the incoming or original data packet should not be marked, the method comprises 200 simply moving forward to the next operation in the sequence without a marking or a replication of the original data packet. Alternatively, the determination may be to mark the original data packet with a unique identifier, which is shown at 210.

As shown at 212, the method 200 further comprises increasing by 1 the stored number in the sequence. Said differently, the number that the receiving port, i.e, management device 40 and/or 30, will retrieve is the current sequence number+1. Thereafter, as shown at 214 the method 200 comprises using the sending management device, i.e., 30 and/or 40, and the processor 80 to set the next protocol field to the original enthertype number. This step is advantageous to restore the original ethertype number after duplication. Thereafter, the method 200 comprises setting or otherwise changing the ethertype number to a predetermined ethertype number 216, such that the first or second management devices 30 and/or 40 may ascertain that the specific packet is a marked packet. Thereafter, as shown at 218, the method 200 comprises duplicating the original data packet 218, and as shown at 220 sending the original data packet and the duplicated data packet via corresponding ones of the plurality of transmission links 50 and/or 60.

Figure 6:
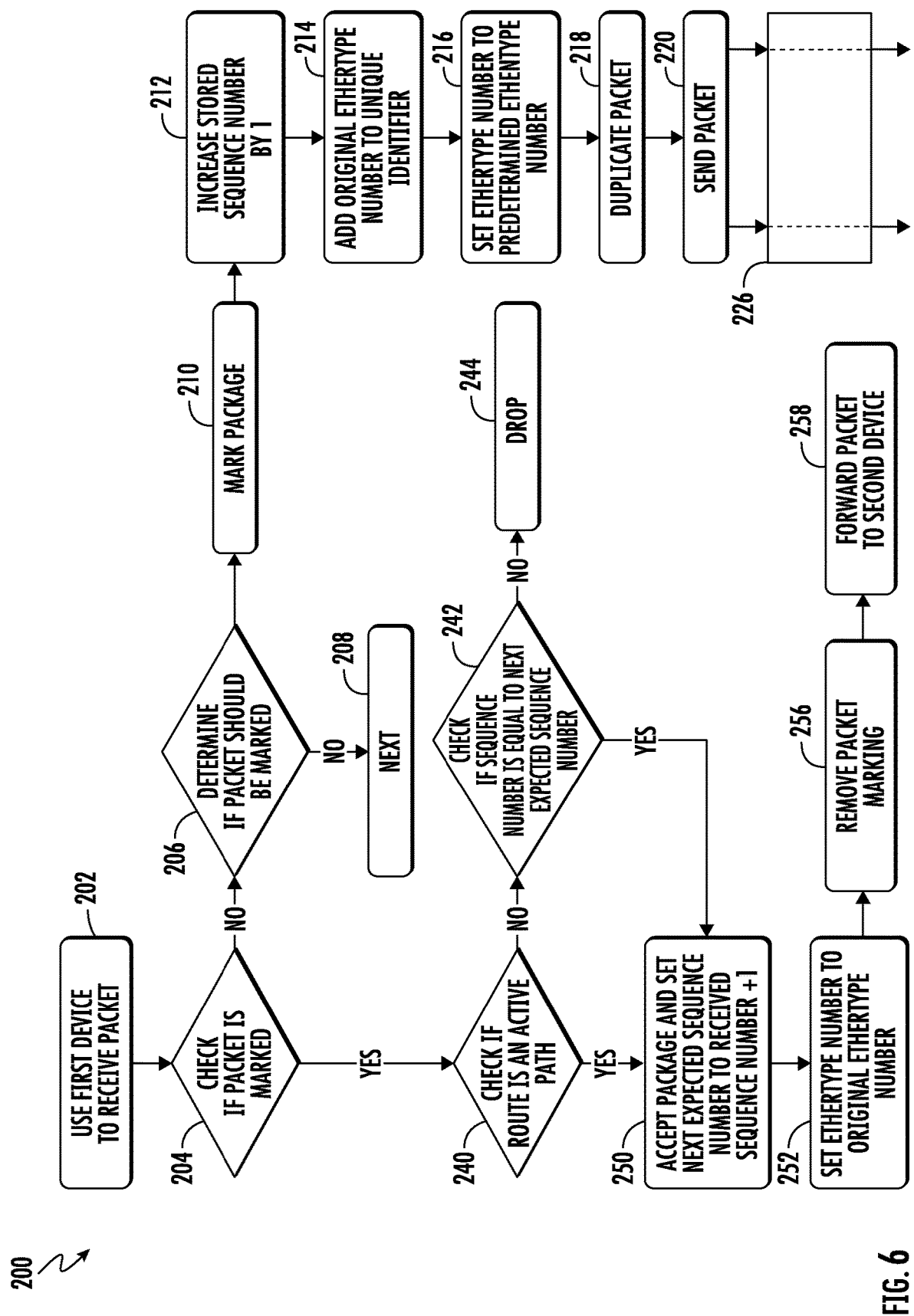
FIG. 6 is a diagrammatic representation of a further embodiment of the method according to the present invention comprising a delay mechanism.
Figure 7:
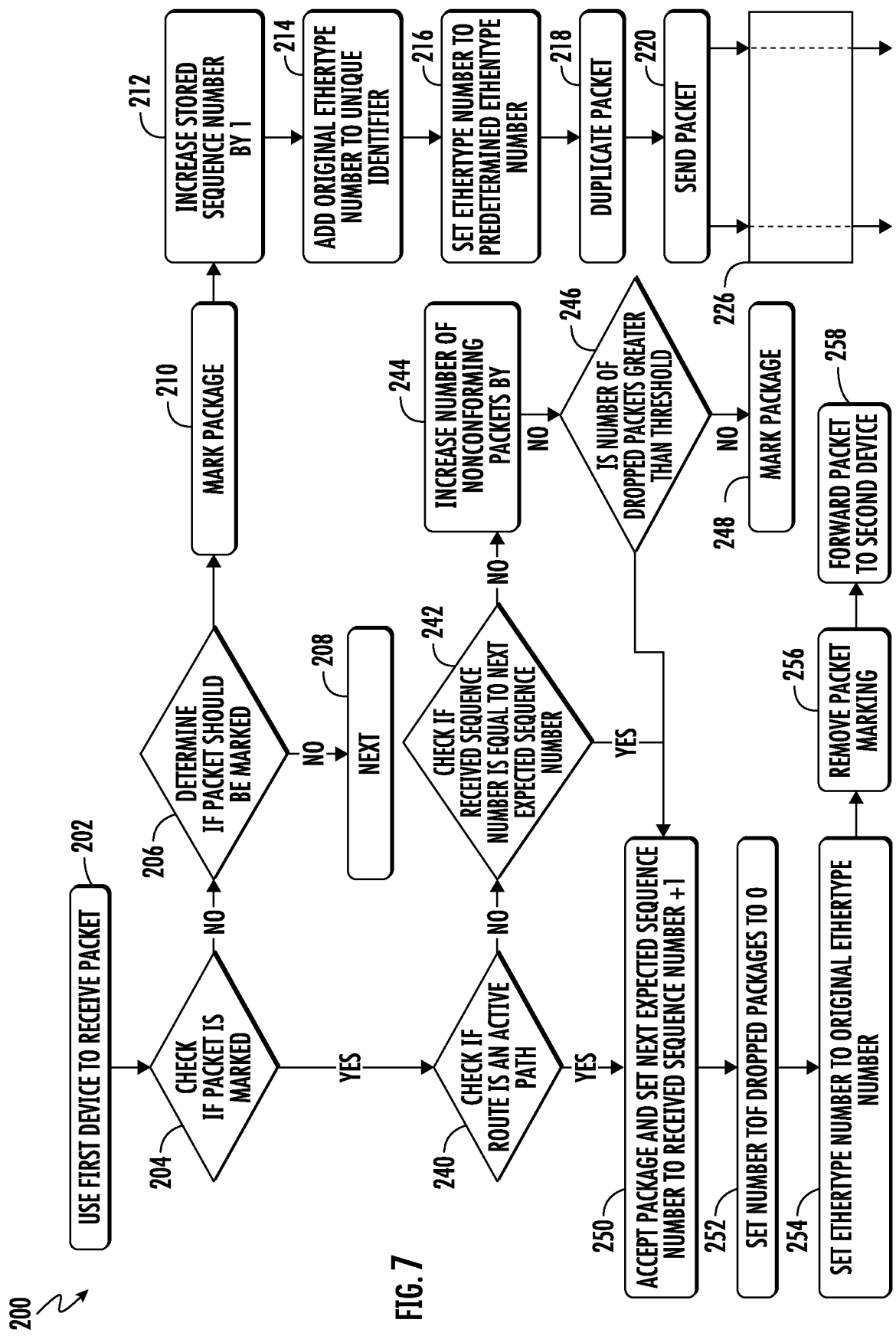
FIG. 7 is a diagrammatic representation of an even further embodiment of the method according to the present invention comprising a delay mechanism.

With references to FIGS. 6 and 7, further features of the method 200 according to the present invention may comprise optionally incorporating a delay mechanism to ensure that the original data packet and the duplicated data packet arrive at approximately the same time. It is contemplated that given that some packets may be lost and/or dropped, that there may be a delay in the timing in which original and corresponding duplicated packets arrive at the receiving ports(s). Said differently some packets may arrive before or later than their counterparts. If an active path or prioritized path is not employed, it is contemplated that some packets may travel through a faster path or transmission link 50 and/or 60 and others through a slower path or transmission link 60 and/or 50. As used herein, an "active path" is a prioritized port to port path or transmission link that indicates that packets with the same sequence number are received on the port that corresponds to the active path first, then on the second port. Thus, if an active path is not used or otherwise prioritized transmission link, at least sone packets may be served by the slower path given that the faster of the two paths would be "out of sync" with respect to the next expected sequence number.

Accordingly, if the slower path fails, some packets may be list until the received sequence numbers of the faster path are realigned or otherwise become "in sync" with the next expected number of the sequence. This is intended to reduce, and in some cases prevent, "deadlocks", as may otherwise occur if a certain number of packets are received out of sequence. As used herein, a "deadlock" may refer to an automatic dropping of an out of sequence(s) packet received at one of the management devices 40 and/or 30. For example, the system 1 may be configured to automatically override a deadlock and drop an intended out of sequence packet(s) once a predetermined number of packets, for example about 100, are received at the management device 40 and/or 30. Nonetheless, it may be ideal that both transmission links comprise the same end-to-end latency, such that packets with the same sequence number arrive at approximately the same time at the deduplication or otherwise receiving switch or management device 40 and/or 30.

With further reference to FIGS. 6-7, the time of transmission of either the original data packet or its counterpart duplicated packet may be selectively delayed with the implementation of a Field Programmable Gate Array (FGPA) based delay mechanism, which is shown at 226. The FGPA-based delay mechanism may communicably connected to the receiving device 40 and/or 30. As may be appreciated from FIGS. 6-7, the independent transmission links, one for the original data packet and one for the duplicated packet may connect the FGPA delay mechanism 226 to the management device 40 and/or 30 as well as the end device 20 and/or 10. As an example, the FGPA-based delay mechanism may comprise a resolution of at least about 10 nano seconds (ns), a minimum delay of about 1 microsecond (µs), and/or a maximum delay determined by the available RAM of the system 1. The FPGA delay mechanism should be configured to buffer packets received on a receiving port or management device 40 and/or 30 for a predetermined and/or adjustable amount of time before the packet is forwarded to its intended receiving device.

As a result, the system 1 may be configured to selectively delay the time of transmission of any given original or duplicated data packet. In addition, the time at which the second packet is sent and/or arrives, i.e., between the original data packet or the duplicated data packet, may be dynamically adjusted in response to the actual arrival time of the other, corresponding data packet that arrives first. Said differently, instead of directly sending the packet to the configured egress port upon duplication, the packet(s) may be forwarded first to the FGPA, which in turn delays the time of transmission of the received packets before they are forwarded to the corresponding end device, e.g., 20 and/or 10. As such, each port can be delayed individually. The foregoing mechanisms may involve a round trip time (RTT) measurement mechanism, which for example, may be itself implemented to measure detect an active path or prioritized transmission link. Such RTT measuring mechanism may further be configured to measure the RTT of an active path, and as such may also be used to the end-to-end delay of a path assuming symmetric latencies by RTT/2. Moreover, based on these measurements, the FPGA may be cooperatively configured with a controller to automatically and/or continuously adjust the delay of individual paths, s.t., such that the delay difference may be compensated.

With reference again the illustrative embodiments of FIGS. 4-7, and as mentioned above, once the ethertype is shown to the predetermined ethertype number, e.g., 51023, the method 200 generally comprises duplicating the packet the corresponding management device 40 and/or 30 to send it to the corresponding transmission link, which is shown at 218. In a delayed replication scheme, i.e., one that does not involve an active path, the first port. i.e., 38 may be configured as a "normal egress port" whereas the second port may be configured as a multicast group that only contains the second port, i.e., 39. A multicast replication may take longer than a "normal" egress transmission. Therefore, packets forwarded through the "normal" egress port are generally transmitted earlier than their multicast counterpart.

Figure 4:
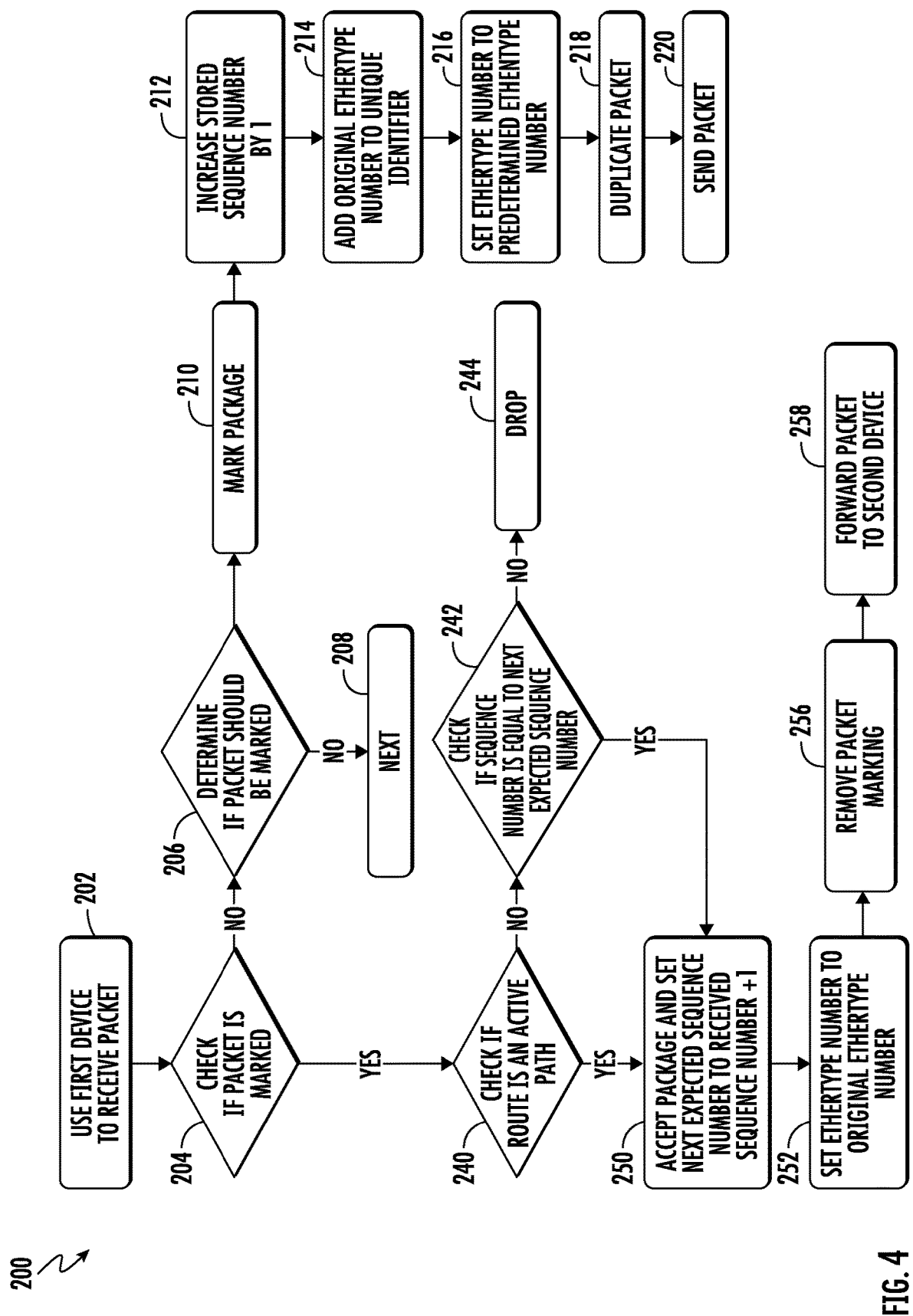
FIG. 4 is a diagrammatic representation of one embodiment of the method according to the present invention.

As shown at 240, if a packet is marked with a unique identifier, the system 1 first ascertains whether it was received on a port associated with an active path or otherwise prioritized transmission link 50 and/or 60. Therefore, each packet received through an active path is generally accepted at the receiving port. Conversely, if a packet was received on a port that is not configured as active path, the system 1, i.e., the corresponding management device 40 and/or 30 may be configured with the processor 80 such that the received sequence number in the unique identifier is equal to next expected sequence number ($Seq_{exp}$). If this occurs, as is shown in FIGS. 4 and 6, the packet is accepted 250, otherwise it is dropped 244. If a packet is accepted, as is shown at 250, the next expected sequence number ($Seq_{exp}$) is set to the received sequence number (mh.seq)+1. Generally, ports that receive the same packets use the same expected sequence number counter. Accordingly, as shown in FIGS. 4-7, thereafter the method 200 generally comprises seeing the ethertype number, i.e., of the Ethernet frame, to the original ethertype number to restore its original value, which is shown at 252 Thereafter, as shown at 256, the method 200 comprises unmarking the packet or otherwise removing the unique identifier from the data packet. Thereafter, the method 200 comprises the packet is forwarded to its final destination 258, which may be for example, the second and/or first device 20 and/or 10 depending on the direction of the dataflow.

As mentioned previously and as shown at 240 throughout the figures, the system 1 may be configured to determine whether a given data packet is being transmitted through an active path or otherwise prioritized transmission link. Said differently, as used herein an "active path" may also refer to a transmission link with shorter end-to-end delays is determined as follows. Generally, the system 1 may be provided with two switches, i.e., management devices 40 and/or 30, one which may serve to duplicate an original packet and the other, which may serve to deduplicate it. Generally, the duplication switch or management device would regularly send RTT packets, including with a unique identifier comprising a send timestamp. The send timestamp may Comprise information associated with the time at which the packet was sent from one switch or management device to another. In addition, the unique identifier of an RTT packet may comprise the time at which the packet was received by the corresponding receiver switch or management device. The unique identifier may also comprise information about which port the specific packet was sent and/or which port it was received. Similarly, the ethertype of an RTT packet may be set to a predetermined amount, e.g., 47872, and/or its send timestamp may be set to the current switch time prior to the packet's duplication. Thereafter, the RTT packet may be replicated to the same ports as it normally would be replicated to.

Before a final transmission of an RTT packet, the send port may be set to either A or B (depending on the outgoing port) and the receive port may be set to the predetermined ethertype number, e.g., 2048, which would serve as an indicator that the RTT packet has not yet been received. It is contemplated that certain ethertype numbers may only be compatible with specific bit requirements of a given switch. Therefore the ethertype number may be selected according to the requirements of the given switch, which involve 16, 32 or 64 but sequences, but also 9 bit sequences. When a switch receives a RTT packet on a receiving port, e.g., port X, and the receiving port's ethertype number is set to the predetermined ethertype number, e.g., 2048, the system 1 may be configured to set the receive port to X and to send the packet back through port X. Further, when a switch receives an RTT packet with a unique identifier that comprises an ethertype number that is not set to the predetermined ethertype number, i.e., a number different than 2048, the system 1 is configured to ascertain that the RTT packet has been received by the deduplication switch and that the RTT packet has returned. Thereafter, the method 200 may involve setting the receive timestamp to the current switch time and use the sender switch to forward the RTT packet to the control plane. Based on the send timestamp and receive timestamp, the control plane can determine the actual RTT associated with the packet. Based on the RTT information from different ports, the control plane can select the active path for a deduplication process.

Figure 5:
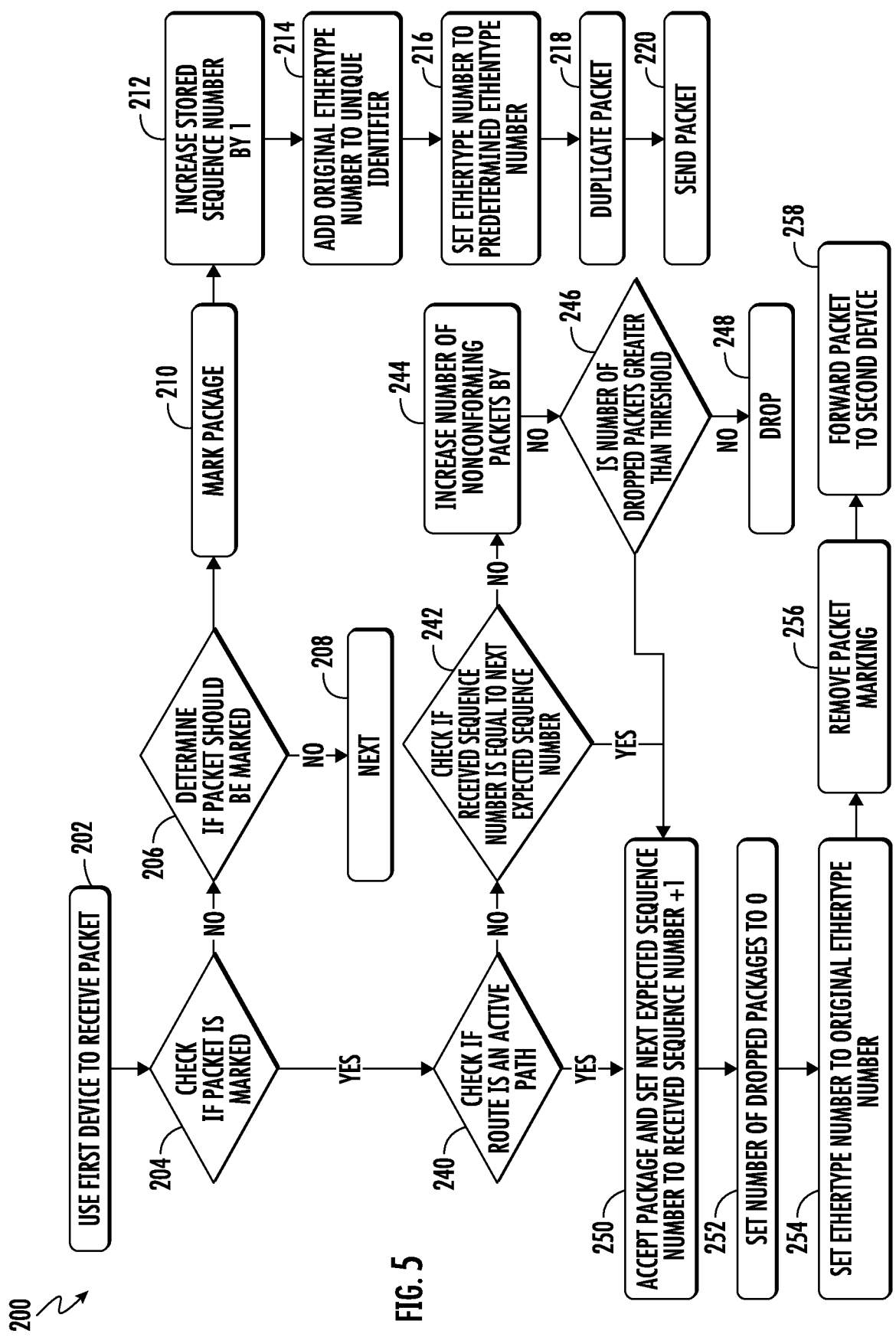
FIG. 5 is a diagrammatic representation of another embodiment of the method according to the present invention.

With specific reference to FIGS. 5 and 7, the inventive method 200 also contemplates a duplication scheme that does not involve an active path. With specific reference to FIG. 5, the inventive method 200 may involve a scheme that does not involve a selective or dynamic delay associated with the transmission of a data packet. With specific reference to FIG. 7, the inventive method 200 may involve a selective or dynamic delay associated with the transmission of a packet without the implementation of an active path protocol or scheme. For example, once a packet arrives on a given port, e.g., port X or ingress port X, the operative components of the system 1 may check whether the packet is marked with a unique identifier 204 and if it is, the system 1 may check whether the received packet is associated with an active path 240. As show in FIGS. 5 and 7, after the system 1 ascertains that the packet should be marked 206 and after marking it 210 or otherwise assigning it a unique identifier, the method comprises 200 setting the next expected sequence number to the received sequence number plus one (+1), which is shown at 212. Said differently, the method 200 contemplates retrieving the next sequence number $Seq_{next}$ from a register where port number X may be used as an index. The present invention further contemplates that various sequence numbers may be specifically stored at individual ingress ports.

Consequently, as shown at 212 the sequence number in the unique identifier should be set to the next expected sequence number ($Seq_{next}$) and the stored sequence number ($Seq_{next}$) in the register may be increased by one (1). The next protocol field, i.e., the ethertype in the unique identifier, should be generally set to the predetermined ethertype number 214 in order for the system 1 to be able to restore the original ethertype number after a successful duplication and/or transmission. Thereafter, the packet is duplicated to the two desired ports. In the no-delayed duplication scheme, i.e., the illustrative embodiment of FIG. 5, the first port is set as multicast group a, and the second port is set as multicast group b. Both multicast groups contain a single port. As both egress ports are served through multicast groups, both packet copies are transmitted at (approximately) the same time.

Thereafter, as shown at 242, if a packet is marked, but does not come from a prioritized transmission link or active path, the system 1 is configured to ascertain whether the received sequence number in the unique identifier is equal to the next expected sequence number ($Seq_{exp}$) If this is the case, the packet is accepted 250. However, if this is not the case, as shown at 244, a tally of the total number of "dropped" ($d_{packets}$) or otherwise out of sequence may be kept in the registry and every time that an out of sequence packet arrives and/or is dropped, the system 1 may add one (1) to the total running number of dropped packets. Here too, it is contemplated that this information regarding the total number of out of sequence and/or dropped packets and the associated tally should be stored within the registry. Consequently, as shown at 246, a received packet(s) may be accepted according to the total number out of sequence and/or dropped packets in the tally. For example, a packet(s) may be accepted if the total number of dropped packets exceeds a threshold amount of dropped packets, otherwise if the threshold number is not exceeded, the packet may be simply dropped. Said differently, if the current total number of out of sequence packets is less than a threshold value of dropped packets, the method 200 comprises dropping the original data packet 248.

Conversely, if the current total number of out of sequence packets is greater than a threshold value of dropped packets, the method 200 comprises using the processor 80 and the second management device to accept the original data packet and to add 1 to the next expected sequence number. By way of example only, such a threshold may involve between 10 to 50 dropped packets. The rational in this mechanism is to lower the risk of, and/or prevent, a deadlock in the case that the same packet has been lost on both paths. As a further example, if two different ports are configured to receive an original and a duplicated set of packets, both may be provided with the same tally of dropped packets ($d_{packets}$). Thereafter, as shown at 250, if a packet is accepted, the next expected sequence number ($Seq_{exp}$) is set to the received sequence number+1, and as shown at 252, the total number of out of sequence packets in the tally may be dropped to 0. Here also, ports that receive the same packets use the same expected sequence number counter. Then, the method 200 may proceed to setting the ethertype number to the original ethertype number 254 and removing the unique identifier 256. Thereafter, as shown at 258 the packet may be forwarded to its final destination.

The inventive method 200 contemplates that certain requirements would ideally be met in order to ensure an optimal operation of the schemes shown throughout the Figures. For example, if the used paths have different end-to-end delays (as probably will be in real life scenarios), packets with the same sequence number may arrive at the receiving switch at different times. Further, there may be situations where the time difference in such arrival times is enough for an entire sequence of numbers to be exhausted. For example, the associated delay in the packet(s) transmission may be larger than the time it takes to send $2^{16}$, $2^{32}$ and/or $2^{34}$ packets for 16-bit, 32-bit or 64-bit sequence numbers. In such situations it may be difficult, and sometimes not possible, to correctly detect duplicated packets. In addition if a faster one of corresponding transmissions fails, certain packets, which come from the slower path, may ultimately be accepted. In those cases, the next expected sequence number in the stored registry should also be set to the last received sequence number plus one (+1). As such, as soon as a faster path is restored, packets with higher sequence numbers than expected will be received. In the deduplication versions with involving an active path, the next expected sequence number will be overwritten by the packets received by the faster path. Further, packets with lower sequence numbers that have not yet been received on the slower path should be subsequently dropped. This issue is addressed by implementing an FGPA delay mechanism, e.g., 226.

Only by way of example and not to be construed in a limited sense, the method 200 according to the present invention may be used in connection with the following hardware: P4 programmable hardware (P4 programmable ethernet switch or P4 programmable SmartNIC) for ethernet BW 10G, 40G, 100G and 400G, using P4 language; FPGA based delay SmartNICs with at least one 100G or 400G ethernet ports and at least two lines of DDR4 memory (for 100G) or multiple lines of HBM memory (for 400G), including using RTL programming; FPGA based Smartnics with at least 3×100g ethernet ports and at least two lines of DDR4 memory or multiple lines of HBM memory, including using RTL programming. For smaller BW (10G, 1G or less), Linux server with multiport 1G/10G PCI NIC, using DPDK programing library.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for the transmission of a data packet via multiple ethernet transmission links, the method comprising:
   providing a system comprising:
      a first device and a first management device operatively configured with one another to enable a reciprocal data flow between them,
      a second device and a second management device operatively configured with one another to enable a reciprocal data flow between them,
      each one of the first management device and the second management device operatively configured with one another to enable a reciprocal data flow between them via a plurality of transmission links, and
      a processor operatively configured with at least the first management device and second management device to enable and control the reciprocal data flow between the first management device and second management device,
   using the processor to receive an original data packet on the first device and to send the original data packet to the first management device,
   if the original data packet is not marked with a unique identifier:
   using the processor and the first management device to mark the packet with the unique identifier; the unique identifier comprising at least a sequence number associated with the original data packet and an original ethertype number associated with the original data packet, and
   using the processor and the first management device to add 1 to the sequence number associated with the original data packet and to set the original ethertype number associated with the original data packet to a predetermined ethertype number,
   using the processor and the first management device to duplicate the original data packet and to send the original data packet and the duplicated data packet from the first management device to the second management device through independent and corresponding ones of the plurality of transmission links.

2. The method as recited in claim 1 wherein each one of the first management device and the second management device comprise a buffer assembly configured to store at least information associated with the data flow between the first device and the first management device, the first management device and the second management device and the second management device and the second device.

3. The method as recited in claim 2 wherein the information associated with the data flow comprises at least a sequence number associated with the original data packet, an original ethertype number associated with the original data packet and a next expected sequence number associated with a subsequent data packet.

4. The method as recited in claim 2 wherein the buffer assembly is operatively configured with the processor and the first management device to adjust the time at which the original data packet or the duplicated data packet is sent from the first management device to the second management device.

5. The method as recited in claim 4 wherein the buffer assembly is operatively configured with the processor to dynamically adjust the time at which the original data packet or the duplicated data packet is sent to the second management device based on the time at which the first of these two packets arrives at the second management device.

6. The method as recited in claim 4 wherein the buffer assembly is operatively configured with the processor to adjust the time at which the original data packet or the duplicated data packet is sent to the second management device via a field programmable gate array (FGPA) delay mechanism.

7. The method as recited in claim 1 wherein the processor is operatively configured with the first device and the first management device to enable and control the reciprocal data flow between them; the processor being operatively configured with the second device and the second management device to enable and control the reciprocal data flow between them.

8. The method as recited in claim 1 further comprising using the processor and the first management device to ascertain whether the original data packet is marked with a unique identifier.

9. The method as recited in claim 8 further comprising:
   if the original data packet is not marked with the unique identifier, using the processor and the first management device to determine if the packet should be marked with the unique identifier.

10. The method as recited in claim 1 further comprising:
    if the original data packet is marked with the unique identifier, using the processor and the first management device to determine if the corresponding transmission link associated with the original data packet is a prioritized transmission link.

11. The method as recited in claim 10 further comprising:
    if the corresponding transmission link associated with the original data packet is not a prioritized transmission link, using the processor and the second management device to ascertain if the sequence number associated with the original data packet is equal to a next expected sequence number.

12. The method as recited in claim 11 further comprising:
    if the sequence number associated with the original data packet is not equal to the next expected sequence number, using the processor and the second management device to drop the original data packet.

13. The method as recited in claim 11 further comprising:
    if the sequence number associated with the original data packet is not equal to the next expected sequence number, using the processor and the second management device to count the original data packet as 1 in a current total number of out of sequence packets.

14. The method as recited in claim 13 further comprising:
    if the current total number of out of sequence packets is less than a threshold value of dropped packets, dropping the original data packet.

15. The method as recited in claim 13 further comprising:
    if the current total number of out of sequence packets is greater than a threshold value of dropped packets, using the processor and the second management device to accept the original data packet and to add 1 to the next expected sequence number.

16. The method as recited in claim 11 further comprising:
    if the sequence number associated with the original data packet is equal to the next expected sequence number or if the corresponding transmission link associated with the original data packet is a prioritized transmission link, using the processor and the second management device to accept the original data packet and to add 1 to the next expected sequence number.

17. The method as recited in claim 10 further comprising:
    if the corresponding transmission link associated with the original data packet is an active path, using the processor and the second management device to accept the original data packet and to add 1 to the next expected sequence number.

18. The method as recited in claim 17 further comprising:
using the processor and the second management device to set the predetermined ethertype number to the original ethertype number, and
using the processor and the second management device to unmark the original data packet and to send the original data packet to the second device.

19. A method for the transmission of a data packet via multiple ethernet transmission links, the method comprising:
providing a system comprising:
a first device and a first management device operatively configured with one another to enable a reciprocal data flow between them,
a second device and a second management device operatively configured with one another to enable a reciprocal data flow between them,
each one of the first management device and the second management device operatively configured with one another and configured to enable a reciprocal data flow between them via a two transmission links,
each of the first management device and the second management device comprising a buffer assembly with a memory alignment buffer, the buffer assembly configured to store information associated with the data flow comprising at least a sequence number associated with the original data packet and a next expected sequence number, the buffer assembly cooperatively configured with a processor and the first management device to selectively adjust the time at which either or both of the original data packet and the duplicated data packet are sent from the first management device to the second management device based on the time at which the first of these two packets arrives at the second management device,
the processor being operatively configured with the first device, the second device, the first management device and the second management device; the processor further configured to enable and control: the reciprocal data flow between the first management device and second management device, the reciprocal data flow between the first device and the first management device and the reciprocal data flow between the second management device and the second device,
using the processor to receive an original data packet on the first device and to send the original data packet to the first management device,
using the processor and the first management device to mark the packet with a unique identifier; the unique identifier comprising at least a sequence number associated with the original data packet and an original ethertype number associated with the original data packet,
using the processor and the first management device to add 1 to the sequence number associated with the original data packet and to set the original ethertype number associated with the original data packet to a predetermined ethertype number,
using the processor and the first management device to duplicate the original data packet and to send the original data packet and the duplicated data packet from the first management device to the second management device through independent and corresponding ones of the two transmission links,
using the processor and the second management device to ascertain if the sequence number associated with the original data packet is equal to a next expected sequence number,
if the sequence number associated with the original data packet is not equal to the next expected sequence number, using the processor and the second management device to drop the original data packet,
or if the sequence number associated with the original data packet is equal to the next expected sequence number, using the processor and the second management device to accept the original data packet and to add 1 to the next expected sequence number,
using the processor and the second management device to set the predetermined ethertype number to the original ethertype number, and
using the processor and the second management device to unmark the original data packet and to send the original data packet to the second device.

* * * * *